United States Patent
Decker et al.

(10) Patent No.: US 6,512,546 B1
(45) Date of Patent: Jan. 28, 2003

(54) IMAGE SENSOR USING MULTIPLE ARRAY READOUT LINES

(75) Inventors: Steven Decker, Derry, NH (US); Stuart Boyd, South Hamilton, MA (US); Laurier St. Onge, Londonderry, NH (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/118,526

(22) Filed: Jul. 17, 1998

(51) Int. Cl.$^7$ ............................................. H04N 5/335
(52) U.S. Cl. ...................... 348/308; 348/280
(58) Field of Search ................................. 348/272, 273, 348/278, 279, 280, 281, 294, 302, 308; 250/208.1; H04N 5/335

(56) References Cited

U.S. PATENT DOCUMENTS

| | | | |
|---|---|---|---|
| 4,580,160 A | | 4/1986 | Ochi et al. |
| 5,132,803 A | * | 7/1992 | Suga et al. .................. 348/315 |
| 5,148,268 A | | 9/1992 | Tandon et al. |
| 5,293,240 A | | 3/1994 | Matsunaga |
| 5,402,143 A | | 3/1995 | Ge et al. |
| 5,452,001 A | | 9/1995 | Hosier et al. |
| 5,459,509 A | | 10/1995 | Monoi |
| 5,461,397 A | | 10/1995 | Zhang et al. |
| 5,477,345 A | | 12/1995 | Tse |
| 5,483,053 A | | 1/1996 | Johnson et al. |
| 5,493,331 A | | 2/1996 | Takahashi et al. |
| 5,521,640 A | * | 5/1996 | Prater .......................... 348/273 |
| 5,774,182 A | | 6/1998 | Mutoh et al. |
| 5,780,840 A | | 7/1998 | Lee et al. |
| 5,780,914 A | | 7/1998 | Kim |
| 5,786,588 A | * | 7/1998 | Takahashi ................. 250/208.1 |
| 5,801,850 A | | 9/1998 | Maki et al. |
| 5,859,712 A | | 1/1999 | Kim |
| 6,078,304 A | | 6/2000 | Miyazawa |
| 6,166,831 A | | 12/2000 | Boyd et al. |

* cited by examiner

Primary Examiner—Tuan Ho
(74) Attorney, Agent, or Firm—Wolf, Greenfield & Sacks, P.C.

(57) ABSTRACT

In one embodiment, an image sensor includes an area pixel array, column readout lines, and array readout lines, wherein the area pixel array includes columns of pixels, each including pixels of a first type, each column readout line is selectively coupled to outputs of the pixels of the first type that are included in a respective column of pixels, and each array readout line is selectively coupled to at least one of the first column readout lines. In another embodiment, an image sensor includes a pixel array, column readout lines, and array readout lines, wherein the pixel array includes a row of pixels which includes pixels of a first type, each column readout line is selectively coupled to an output of a respective pixel of the first type that is included in the row of pixels, and each array readout line is selectively coupled to at least one of the column readout lines.

24 Claims, 14 Drawing Sheets

IMAGE SENSOR USING MULTIPLE ARRAY READOUT LINES

BACKGROUND OF THE INVENTION

1. Field of the Invention

The present invention is directed to image sensors and, more particularly, to systems for reading out the contents of pixels in image sensors.

2. Discussion of Related Art

Image sensors are used to generate images based upon the outputs of a large number of light-sensitive pixels. Pixels commonly are arranged in an area array of "n-by-m" pixels (an area sensor). Each pixel in such an array generates an output signal that is proportional to an amount of light that is incident on that pixel during a so-called "integration period." All of the pixels in the array generally are permitted to "integrate" for a predetermined amount of time during an integration period and the contents of the pixels in the array are individually "read out" during a so-called "read out period." In this manner, an image may be generated based upon the contents of the pixels in the array.

FIG. 1 shows an area array of pixels and a prior art system for reading out the contents of each pixel in the array. As shown, the array includes "n+1" rows and "m+1" columns of pixels. Only the pixels in the corners of the array are illustrated in FIG. 1. The first row of pixels (i.e., row "0") includes pixels P0,0 through P0,m, and the final row of pixels (i.e., row "n") includes pixels Pn,0 through Pn,m. Similarly, the first column of pixels (i.e., column "0") includes pixels P0,0 through Pn,0, and the final column of pixels (i.e., column "m") includes pixels P0,m through Pn,m.

Each column of pixels in FIG. 1 is associated with a column readout line (CRL), a correlated double-sampling (CDS) circuit, and a row-select switch (RSS). In the example shown, pixel column "0" is associated with column readout line CRL0, correlated double-sampling circuit CDS0 and column-select switch CSS0, and pixel column "m" is associated with column readout line CRLm, correlated double-sampling circuit CDSm and column-select switch CSSm. Each column-select switch is connected to a common array readout line ARL.

Each row of pixels in the FIG. 1 circuit has a group of row-select switches (RSSs) associated with it. Each group of row-select switches selectively connects the outputs of the pixels in a particular row to respective column readout lines. In the example shown, pixel row "0" includes row-select switches RSS0,0 through RSS0,m, which selectively connect the outputs of pixels P0,0 through P0,m, respectively, to column readout lines CRL [0 . . . m]. Similarly, pixel row "n" includes row-select switches RSSn,0 through RSSn,m, which selectively connect the outputs of pixels Pn,0 through Pn,m, respectively, to column readout lines CRL [0 . . . m].

Typically, all pixels in the array, i.e., pixels P0,0 through Pn,m, are simultaneously caused to integrated charge using signals on control lines (not shown). After an integration period, each of pixels P0,0 through Pn,m stores a charge that is proportional to the intensity of the light that was incident on it during the integration period. Commonly, circuitry in each of the pixels converts this charge into a voltage and this voltage is provided at the output of the pixel. Rows of pixels are selected one-at-a-time by sequentially closing one group of row select switches at a time. For example, pixel row-select switches RSS0,0 through RSS0,m to provide the contents of pixels P0,0 through P0,m, respectively, to column readout lines CRL [0 . . . m].

After a particular row of pixels has been selected, control signals cause each of correlated double-sampling circuits CDS [0 . . . m] to sample the voltages presented on column readout lines CRL [0 . . . m], respectively, by the pixels in the selected row. Correlated double-sampling circuits CDS [0 . . . m] operate simultaneously for each row. After the output voltages of a particular row of pixels has been sampled by correlated double-sampling circuits CDS [0 . . . m], each of the pixels in the selected row is reset to its non-integrated state. Correlated double-sampling circuits CDS [0 . . . m] then sample the voltages from the outputs of the selected row of pixels a second time. The configuration of correlated double-sampling circuits CDS [0 . . . m] during this second sampling period cause voltages equal to the differences between the first voltages sampled and the second voltages sampled to be provided at their outputs.

After both samples have been taken by correlated double-sampling circuits CDS [0 . . . m] column-select switches CSS [0 . . . m] are closed one at a time to permit external circuitry (not shown) to measure the amplitude of the voltage on array readout line ARL when each column-select switch is closed, to amplify this voltage, and to convert the voltage into a digital output signal.

Thus, row-select switches RSS0,0 through RSSn,m and correlated double-sampling circuits CDS [0 . . . m] sample the output voltages of one row of pixels at a time, and column-select switches CSS [0 . . . m] select the outputs of correlated sampling circuits CDS [0 . . . m] one at a time, thereby providing the output voltage of each of pixels P0,0 through Pn,m to array readout line ARL one at a time.

When each of column-select switches CSS [0 . . . m] is closed to provide the output of the corresponding correlated double-sampling circuit to array readout line ARL, a certain period of time is required to allow the signal on array readout line ARL to settle before using external circuitry to measure the voltage on the line. This settling time is determined primarily by the capacitance of array readout line ARL.

Column-select switches CSS [0 . . . m] generally are implemented using metal oxide semiconductor (MOS) transistors. Each of these MOS transistors has a gate-to-source or gate-to-drain capacitance associated with it that, when connected to array readout line ARL, incrementally increases the readout line's overall capacitance. An area array having a large number of columns requires a large number of column-select switches to selectively provide the outputs of the correlated double-sampling circuits to the readout line for the array. The capacitance added by each of these column-select switches to the total capacitance of array readout line ARL limits the rate at which the outputs of the correlated double-sampling circuits can be selected and therefore limits the rate at which the contents of the pixels in the array may be read out.

Similarly, because each of column-select switches CSS [0 . . . m] is connected to array readout line ARL via a circuit trace having a particular length, each such circuit trace incrementally increases the overall capacitance of array readout line ARL. The capacitance added by each of these circuit traces to the total capacitance of array readout line ARL also limits the rate at which the outputs of the correlated double-sampling circuit can be selected and therefore further limits the rate at which the contents of the pixels in the array may be read out.

What is needed, therefore, is an improved pixel readout scheme for image sensors.

SUMMARY OF THE INVENTION

According to one aspect of the present invention, an image sensor includes an area pixel array, column readout lines, and array readout lines. The area pixel array includes columns of pixels, each including pixels of a first type. Each column readout line is selectively coupled to outputs of the pixels of the first type that are included in a respective column of pixels. Each array readout line is selectively coupled to at least one of the column readout lines.

According to another aspect of the invention, an image sensor includes a pixel array, column readout lines, and array readout lines. The pixel array includes a row of pixels which includes pixels of a first type. Each column readout line is selectively coupled to an output of a respective pixel of the first type that is included in the row of pixels. Each array readout line is selectively coupled to at least one of the column readout lines.

BRIEF DESCRIPTION OF THE DRAWINGS

The present invention will be more clearly appreciated from the following detailed description when taken in conjunction with the accompanying drawings, in which like-reference numerals indicate like structures or method steps, and in which the left-most one or two numerals of a reference numeral indicate the number of the figure in which the referenced element first appears, and in which.

DETAILED DESCRIPTION OF THE INVENTION

Figure 1:
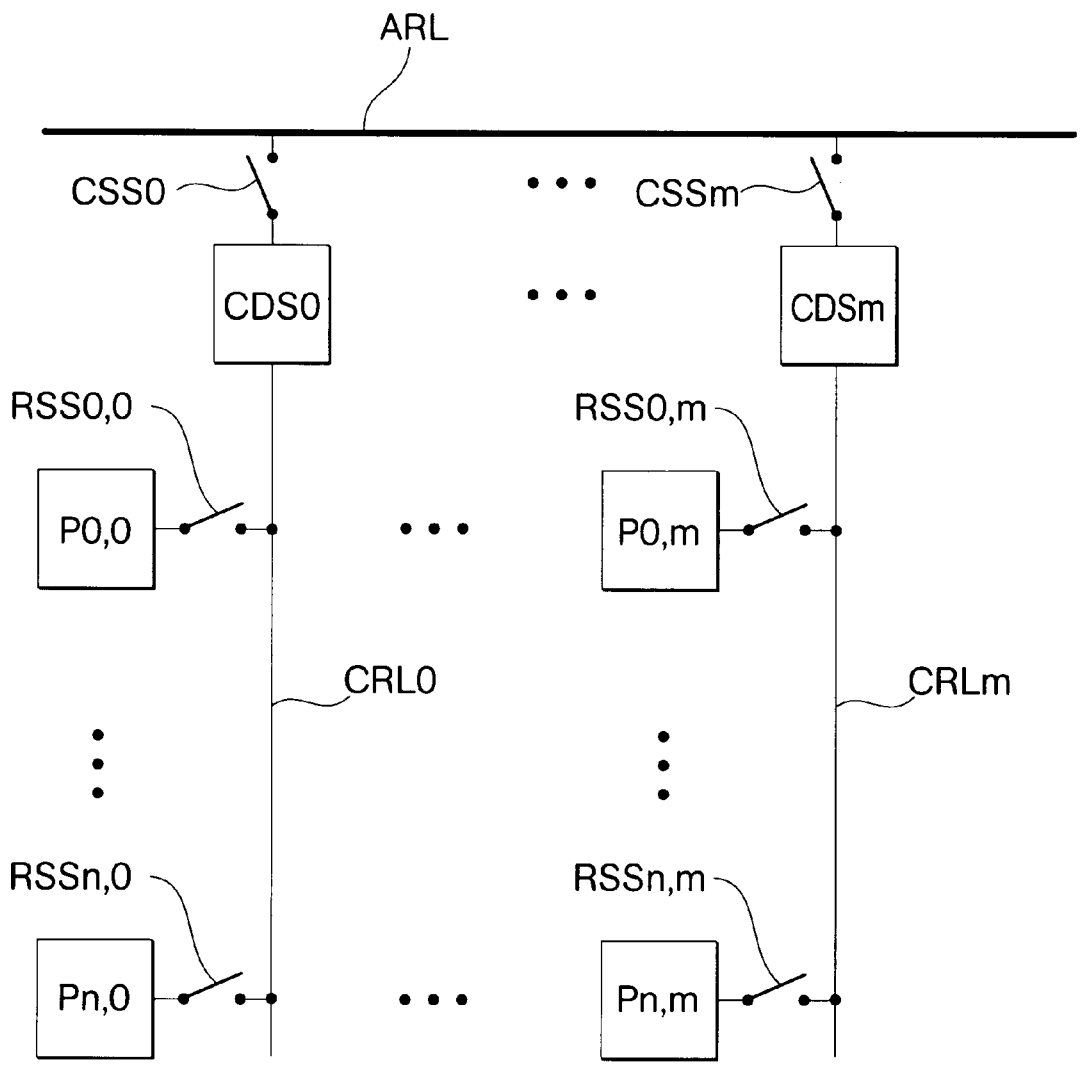
FIG. 1 is a block diagram showing area array of pixels and a prior art readout scheme therefor.
Figure 2:
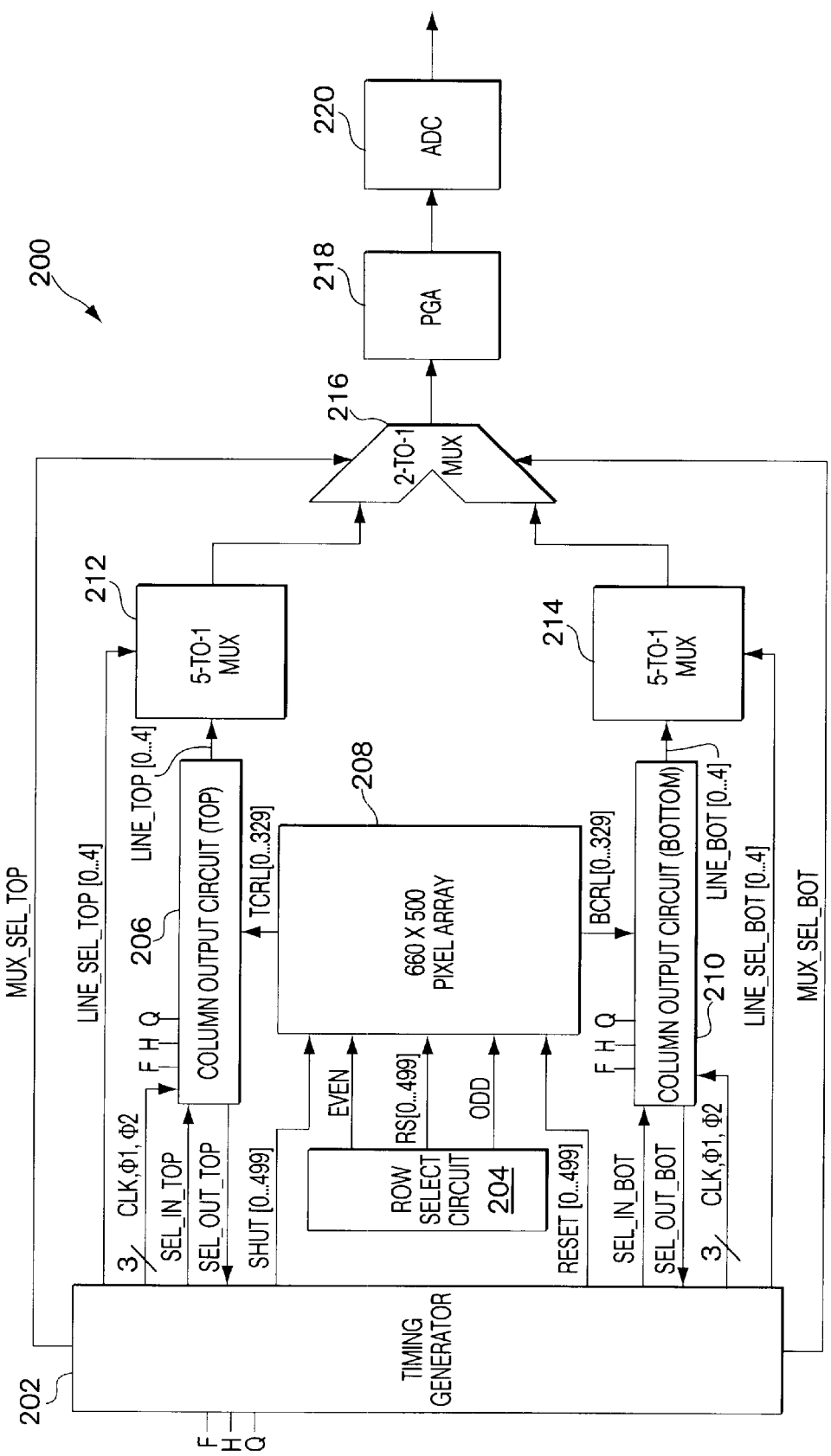
FIG. 2 is a block diagram showing a system for reading out an array of pixels according to one embodiment of the present invention.

FIG. 2 is a block diagram showing a system 200 for reading out the contents of pixels in an area pixel array 208 according to one embodiment of the invention. In addition to pixel array 208, system 200 includes a timing generator 202, a row-select circuit 204, top and bottom column-output circuits 206 and 210, 5-to-1 multiplexers 212 and 214, 2-to-1 multiplexer 216, programmable-gain amplifier (PGA) 218, and analog-to-digital converter (ADC) 220. FIG. 2 also shows several signal lines that interconnect the various elements of system 200. These signal lines correspond to the identically-labeled signal lines that are shown in FIGS. 3–7, which show various components of system 200 in more detail. It should be appreciated that additional signal lines may be provided to increase the performance or facilitate the operation of system 200, or fewer or different signal lines may be provided when employing a simpler or different embodiment of the invention.

Timing generator 202 controls the timing of system 200. Signals generated by timing generator 202 are provided to the various system components via the signal lines illustrated in FIG. 2. These signals may be generated using hardware, firmware, software or any combination thereof. The details of how timing generator 202 generates signals are unimportant to understand the invention and therefore will not be described.

Row-select circuit 204 and top and bottom column-output circuits 206 and 210 are controlled by timing generator 202 to select particular rows and particular columns of pixels in pixel array 208 for readout. Advantageously, each of column-output circuits 206 and 210 includes five array readout lines (line_top [0 . . . 4] and line_bot [0 . . . 4], respectively) to read out the contents of pixel array 208. Multiplexers 212, 214 and 216, in combination, select one of these ten array readout lines at a time and provide the analog signal on the selected line to PGA 218. PGA 218 amplifies the analog signal output by multiplexer 216 and ADC 220 converts this amplified signal into a serial or parallel digital output signal.

In one embodiment, column-output circuits 206 and 210 output differential signals on array readout lines line_top [0 . . . 4] and line_bot [0 . . . 4], respectively. In such an embodiment, each of the array readout lines line_top [0 . . . 4] and line_bot [0 . . . 4] in the system 200 represents a pair of conductors on which a differential signal may be provided. Also, in this embodiment, multiplexers 212–216 and PGA 218 may be fully differential, and PGA 218 may provide a differential signal to ADC 220 for conversion to a digital signal.

Alternatively, column-output circuits 206 and 210 may output single-ended signals on array readout lines line_top [0 . . . 4] and line_bot [0 . . . 4], respectively. In such an embodiment, each of array readout lines line_top [0 . . . 4] and line_bot [0 . . . 4] represents a single conductor on which a single-ended signal may be provided. Also, in this embodiment, multiplexers 212–216 and PGA 218 may be single-ended, and PGA 218 may provide a single-ended signal to ADC 220 for conversion to a digital signal.

Figure 3:
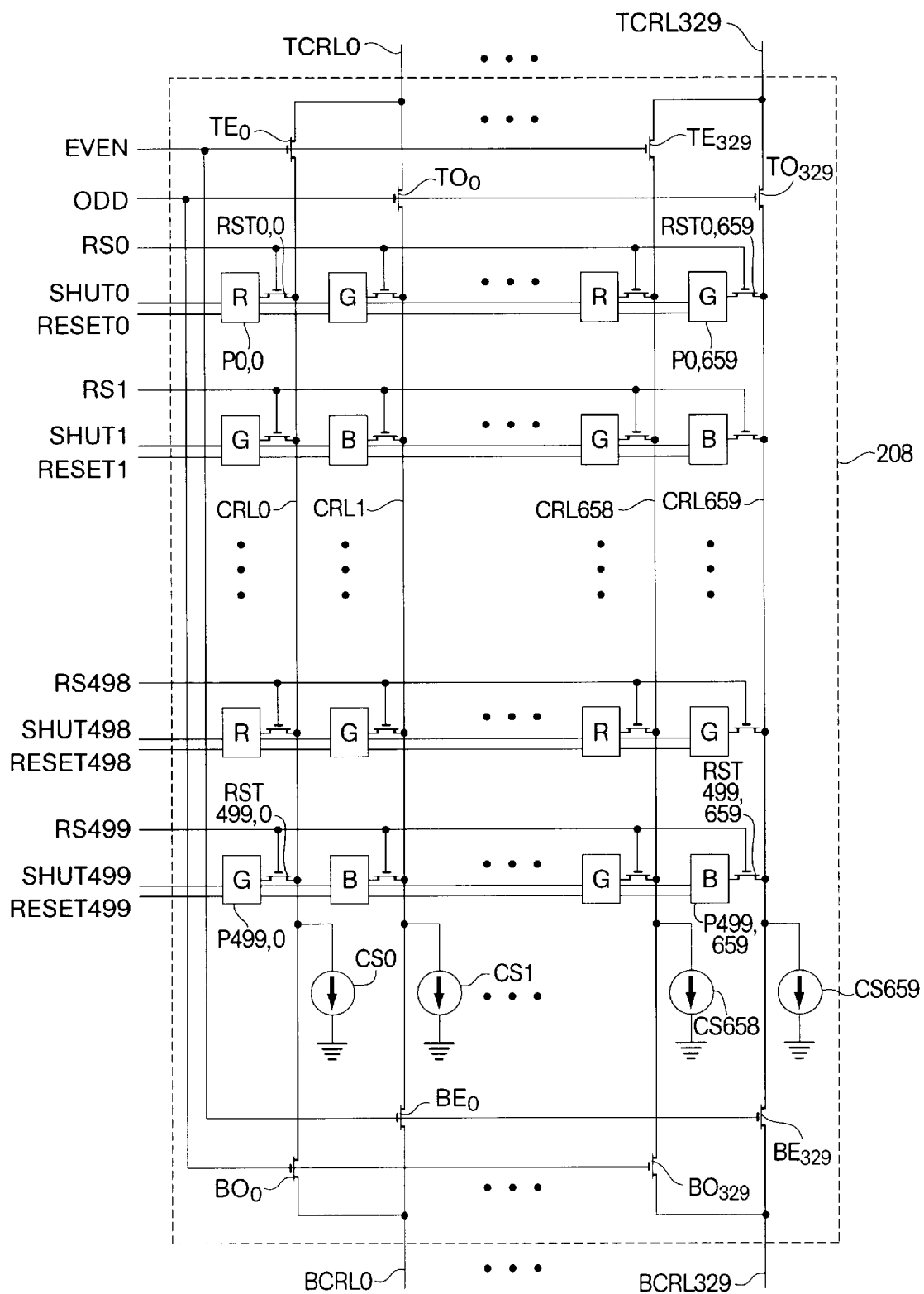
FIG. 3 is a partial schematic/partial block diagram showing an example embodiment of the pixel array shown in FIG. 2.

FIG. 3 is a partial schematic/partial block diagram showing an example embodiment of pixel array 208 (FIG. 2). As shown, pixel array 208 includes five-hundred rows of pixels, with each row including six-hundred and sixty individual pixels arranged in respective columns. For example, pixel row "0" includes pixels P0,0 through P0,659; pixel row "499" includes pixels P499,0 through P499,659; pixel column "0" includes pixels P0,0 through P499,0; and pixel column "659" includes pixels P0,659 through P499,659. Pixel array 208 therefore includes 330,000 individual pixels.

Outputs of the pixels in each column are selectively connected (via row-select transistors) to a corresponding one of column readout lines CRL0 through CRL659. For example, outputs of pixels P0,0 through P499,0 (in column "0") are selectively connected to column readout line CRL0 via row-select transistors RST0,0 through RST499,0, respectively, and outputs of pixels P0,659 through P499,659 (in column "659") are selectively connected to column readout line CRL659 via row-select transistors RST0,659 through RST499,659, respectively.

The gates of all row-select transistors included in a particular row are connected to a corresponding one of row-select lines RS [0 . . . 499]. For example, the gates of row-select transistors RST0,0 through RST0,659 (in row "0") all are connected to row-select line RS0, and the gates of row-select transistors RST499,0 through RST499,659 (in row "499") all are connected to row-select line RS499. Therefore, by providing an active signal on only one of row-select lines RS [0 . . . 499], outputs of only one row of pixels is be selected at a given time.

Each of column readout lines CRL [0 . . . 659] has a corresponding one of current sources CS [0 . . . 659] connected to it. These current sources serve to bias source-follower transistors (e.g., source-follower transistor SF0,0 shown in FIG. 4) included in the pixels of a selected row.

In the embodiment shown, each pixel is configured to be sensitive to either red, green, or blue light, and the pixels are arranged in a so-called "Bayer" pattern. That is, each pixel row includes green pixels interspersed with either red pixels (in even-numbered rows, i.e., rows "0,2,4 . . . 498") or blue pixels (in odd-numbered rows, i.e., rows "1,3,5 . . . 499") such that one-half of the pixels in the array are green, one-fourth are red, and one-fourth are blue. It should be appreciated, however, that other arrangements of pixels and pixels that are sensitive to other color(s) of light may alternatively be used, and that the invention is not limited to any particular arrangement or color(s) of pixels.

Because, in the embodiment shown in FIG. 3, for any selected row of pixels, one-half of the pixels are green and one-half of the pixels are either red or blue, it is useful to read out the contents of the green pixels on a first set of column readout lines and to read out the contents of the red or blue pixels on a second set of column readout lines. For this purpose, pixel array 208 includes top column readout lines TCRL [0 . . . 329] and bottom column readout lines BCRL [0 . . . 329]. Each of top column readout lines TCRL [0 . . . 329] is selectively connected to: (1) a respective even-numbered one of column readout lines CRL [0 . . . 659] (via a corresponding one of select transistors TE $[_0 \ldots {}_{329}]$), and (2) a respective odd-numbered one of column readout lines CRL [0 . . . 659](via a corresponding one of select transistors T0 $[_0 \ldots {}_{329}]$). Similarly, each of bottom column readout lines BCRL [0 . . . 329] is selectively connected to: (1a respective even-numbered one column readout lines CRL [. . . 659] (via a corresponding one of select transistors B0 $[_0 \ldots {}_{329}]$), and (2) a respective odd-numbered one of column readout lines CRL [0 . . . 659](via a corresponding one of select transistors BE $[_0 \ldots {}_{329}]$).

The gates of select transistors TE $[_0 \ldots {}_{329}]$ and BE $[_0 \ldots {}_{329}]$ are connected to control line EVEN and the gates select transistors T0 $[_0 \ldots {}_{329}]$ and B0 $[_0 \ldots {}_{329}]$ are connected to control line ODD. Control line EVEN receives an active signal (from row-select circuit 204(FIG. 2)) only when an odd-numbered row of pixels is selected for readout, and control line ODD receives an active signal (from row-select circuit 204) only when an odd-numbered row of pixels is selected for readout. Therefore, for even-numbered pixel rows, outputs of the red pixels included in the selected row are read out on respective ones of top column readout lines TCRL [0 . . . 329] and outputs of green pixels included in the selected row are read out on respective ones of bottom column readout lines BCRL [0 . . . 329]. Similarly, for odd-numbered pixel rows, outputs of the blue pixels included in the selected row are read out on respective ones of top column readout lines TCRL [0 . . . 329] and outputs of green pixels included in the selected row are read out on respective ones of bottom column readout lines BCRL [0 . . . 329].

Each pixel row also has a "shutter" control line and a "reset" control line associated with it. Specifically, pixel rows "0" through "499" are connected, respectively, to shutter control lines SHUT [0 . . . 499] and reset control lines RESET [0 . . . 499]. Signals received on these control lines from timing generator 202 control operation of the pixels. The manner in which these signals control operation of the pixels is described below in connection with the description of the timing diagram shown in FIG. 8.

Figure 4:
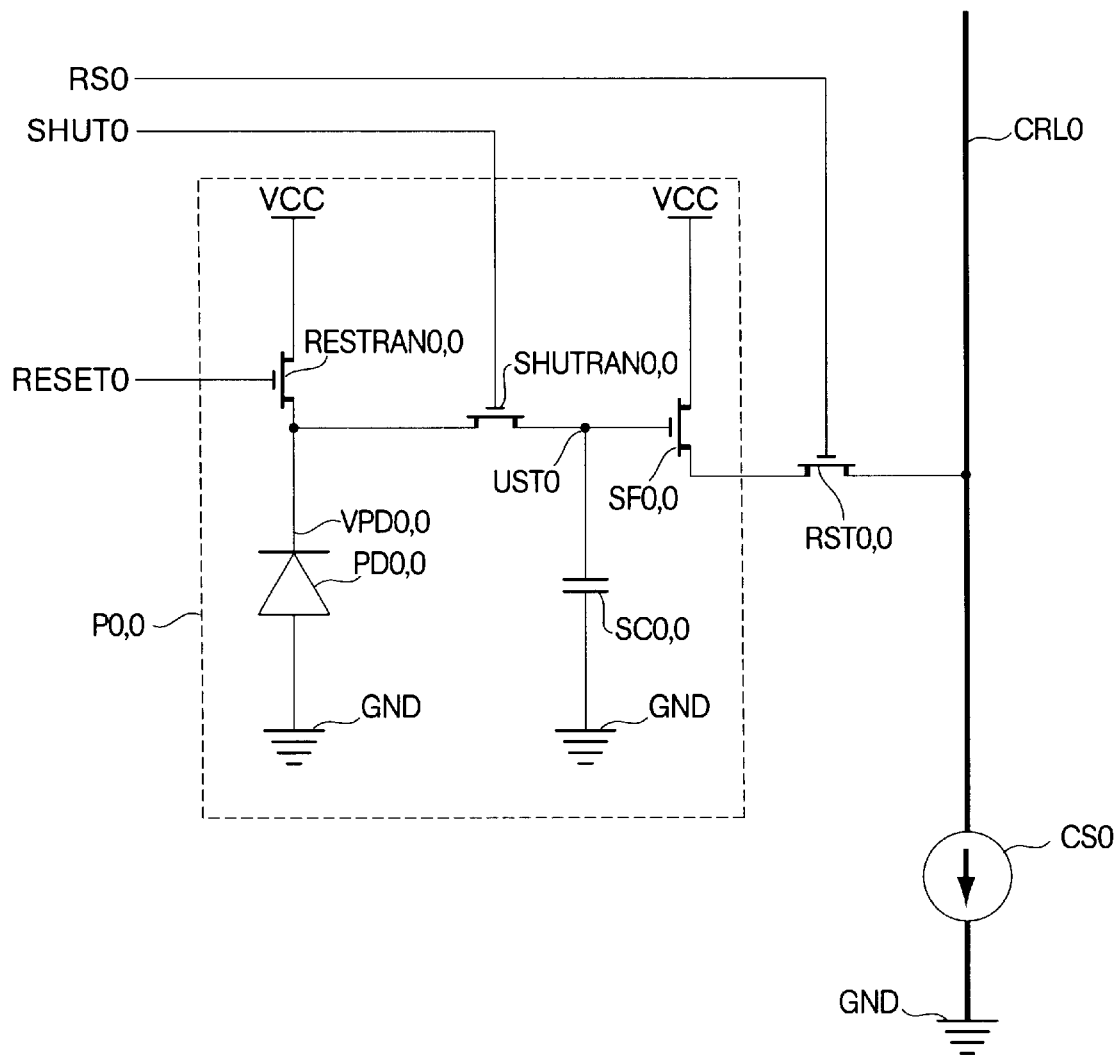
FIG. 4 is a schematic diagram showing an example embodiment of one of the pixels shown in FIG. 3.

FIG. 4 shows an example embodiment of one of the pixels in pixel array 208, i.e., pixel P0,0 . Each of the pixels in array 208 is configured identically so the pixel shown in FIG. 4 is illustrative of each of the pixels in array 208. As shown, pixel P0,0 includes a corresponding photodiode PD0,0, a reset transistor Restran0,0, a shutter transistor Shutran0,0, a storage capacitor SC0,0, and a source-follower transistor SF0,0 . The anode of photodiode PD0,0 is connected to ground node GND and the cathode of photodiode PD0,0 is connected, via reset transistor Restran0,0, to power supply node VCC. The cathode of photodiode PD0,0 also is connected, via shutter transistor Shutran0,0, to the gate of source-follower transistor SF0,0 and to one pole of storage capacitor SC0,0, the other pole of which is connected to ground node GND.

Figure 5:
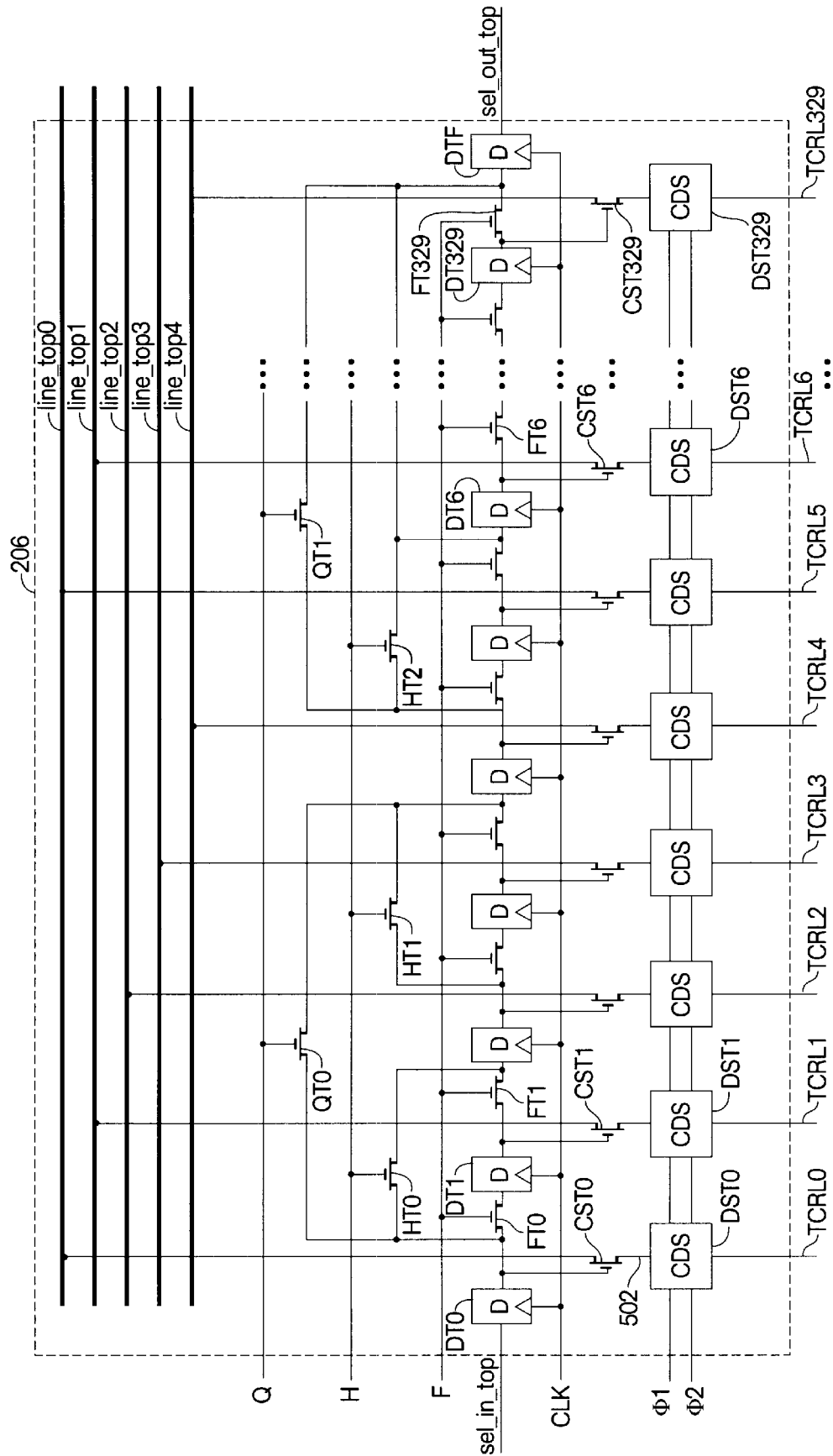
FIG. 5 is a partial schematic/partial block diagram showing an example embodiment of the top column-output circuit shown in FIG. 2.

FIG. 5 is a partial schematic/partial block diagram showing an example embodiment of top column-output circuit 206 (FIG. 2). As shown, each of top column readout lines TCRL [0 . . . 329] is connected to a corresponding one of correlated double-sampling (CDS) circuits DST [0 . . . 329]. An output of each of CDS circuits DST [0 . . . 329] is selectively connected (via a corresponding one of column-select transistors CST [0 . . . 329]) to one of array readout lines line_top [0 . . . 4].

In one embodiment, each of CDS circuits DST [0 . . . 329] provides a differential output signal to one of array readout lines line_top [0 . . . 4]. In such an embodiment, each of array readout lines line_top [0 . . . 4] in top column-output circuit 206 represents a pair of conductors on which the differential signal from a CDS circuit DST [0 . . . 329] may be provided, and each of the column-select transistors CST [0 . . . 329] in circuit 206 represents a pair of transistors to selectively provide the differential output signals from the CDS circuits DST [0 . . . 329] to array readout lines line_top [0 . . . 4].

Alternatively, CDS circuits DST [0 . . . 329] may provide single-ended output signals to array readout lines line_top [0 . . . 4]. In such an embodiment, each of column-select transistors CST [0 . . . 329] in circuit 206 represents a single transistor, and each of array readout lines line_top [0 . . . 4] represents a single conductor.

Figure 6:
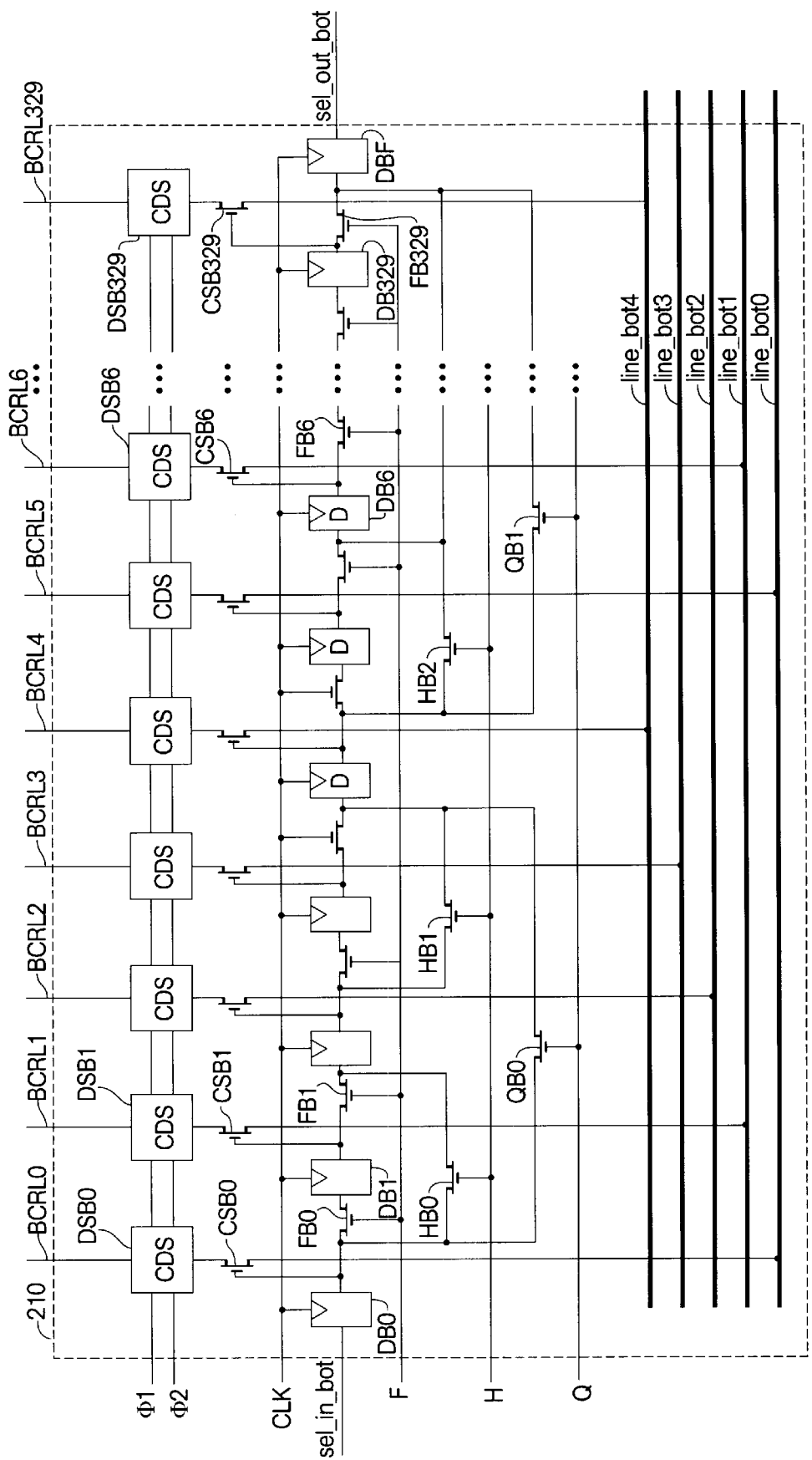
FIG. 6 is a partial schematic/partial block diagram showing an example embodiment of the bottom column-output circuit shown in FIG. 2.

Similarly, FIG. 6 is a partial schematic/partial block diagram showing an example embodiment of bottom column-output circuit 210 (FIG. 2). As shown, each of bottom column readout lines BCRL [0 . . . 329] is connected to a corresponding one of CDS circuits DSB [0 . . . 329]. An output of each of CDS circuits DSB [0 . . . 329] is selectively connected (via a corresponding one of column-select transistors CSB [0 . . . 329]) to one of array readout lines line_bot [0 . . . 4].

In one embodiment, each of CDS circuits DSB [0 . . . 329] provides a differential output signal to one of array readout lines line_bot [0 . . . 4]. In such an embodiment, each of array readout lines line_bot [0 . . . 4] in top column-output circuit 210 represents a pair of conductors on which the differential signal from a CDS circuit DSB [0 . . . 329] may be provided, and each of the column-select transistors CSB [0 . . . 329] in circuit 210 represents a pair of transistors to selectively provide the differential output signals from the CDS circuits DSB [0 . . . 329] to array readout lines line_bot [0 . . . 4].

Alternatively, CDS circuits DSB [0 . . . 329] may provide single-ended output signals to array readout lines line_bot [0 . . . 4]. In such an embodiment, each of column-select transistors CSB [0 . . . 329] in circuit 210 represents a single transistor, and each of array readout lines line_bot [0 . . . 4] represents a single conductor.

In the embodiments shown in FIGS. 5 and 6, no two CDS circuits in each set of five adjacent CDS circuits are selectively connected to the same array readout line. Every sixth CDS circuit, however, is selectively connected to the same array readout line. Signals that may be used to control top and bottom column-output circuits 206 and 210 are described below in connection with the description of the timing diagrams shown in FIGS. 11 and 12.

Each of array readout lines line_top [0 . . . 4] in top column-output circuit 206 is connected to a respective input of 5-to-1 multiplexer 212 (FIG. 2), and multiplexer 212 is controlled such that only one of array readout lines line_top [0 . . . 4] is selected by it at a given time. Similarly, each of array readout lines line_bot [0 . . . 4] in bottom column-output circuit 210 is connected to a respective input of 5-to-1 multiplexer 214 (FIG. 2), and multiplexer 214 is controlled such that only one of array readout lines line_bot [0 . . . 4] is selected by it at a given time. 2-to-1 multiplexer 216 (FIG. 2) receives the outputs of multiplexers 212 and 214 as inputs and is controlled to select only one of them to be provided at its output at a given time. Signals that may be used to control multiplexers 212, 214 and 216 are described below in connection with the description of the timing diagram shown in FIG. 12.

The advantages of using multiple array readout lines, e.g., array readout lines line_top [0 . . . 4] and line_bot [0 . . . 4], rather than a single array readout line, to read out the outputs of the CDS circuits are numerous. For example, the total capacitance of each of the several array readout lines is significantly less than the capacitance that would exist on a single readout line if only one readout line were used. This decrease in capacitance is due in part to the fact that the capacitance added by the parasitic capacitances of the column-select transistors is distributed over several array readout lines rather than being added to the total capacitance of a single array readout line. Additionally, the capacitance added by the circuit traces connecting the column-select transistors to the array readout lines is distributed over the several array readout lines, rather than being added to the total capacitance of a single array readout line. The capacitance seen by the output of each CDS circuit included the top and bottom column-output circuits 206 and 210 therefore is significantly lower than the capacitance seen by the output of each CDS circuit included in prior art circuits that use only a single array readout line.

The lower capacitance seen by the output of each of the CDS circuits reduces the time required for the output signal of each CDS circuit to settle on one of the array readout lines before it is stable enough to be sampled (as compared to the time that would be required for the CDS output signal to settle on a single array readout line). According to one implementation, outputs of the CDS circuits are sequentially provided to particular ones of the array readout lines, and multiplexers 212, 214 and 216, by properly selecting different ones of the multiple array readout lines, provide the CDS output signals to PGA 218 and ADC 220 in the same order that the signals were provided to the array readout lines. Thus, because less time is required for each CDS output signal to settle on one of the array readout lines, outputs of the CDS circuits are provided to the output of multiplexer 216 more rapidly than prior art circuits provide outputs of CDS circuits to a single array readout line.

Additionally, in each of top and bottom column-output circuits 206 and 210, the output signals of the CDS circuits are provided sequentially to different ones of the array readout lines associated with them such that the times at which the signals are provided to the array readout lines overlap for each group of five sequentially-selected CDS circuits. That is, each time an output of one CDS circuit is provided to one of the array readout lines, an output of another previously-selected CDS circuit is disconnected from the same readout line while outputs of four other CDS circuits remain connected to the four other array readout lines. Multiplexer 212 or multiplexer 214 therefore may select the readout line on which the output of a CDS circuit has been present the longest while the outputs of the four other presently-selected CDS circuits are settling on the other four array readout lines. In this manner, the settling time of each array readout line has a less significant impact on the rate at which outputs of the CDS circuits can be sampled than do prior art systems that use only a single array readout line and that must wait a full settling period prior to sampling the signal from the single array readout line each time one of the correlated double-sampling circuits is selected.

Further, the use of two groups of five array readout lines in the embodiment shown enables the same advantages to be achieved regardless of whether the circuit is configured (in the manner explained below) to operate in full-resolution mode, half-resolution mode, or quarter-resolution mode. That is, when full-resolution mode is selected, outputs of the correlating double-sampling circuits are provided to the top or bottom array readout lines line_$top\ [0\ .\ .\ .\ 4]\ or\ line$_bot [0 . . . 4] in the sequence 0, 1, 2, 3, 4, 0, 1, 2, 3, 4; when half-resolution mode is selected, outputs of the CDS circuits are provided to the array readout lines in the sequence 0, 2, 4, 1, 3, 0, 2, 4, 1, 3; and when quarter-resolution mode is selected outputs of the CDS circuits are provided to the array readout lines in the sequence 0, 4, 3, 2, 1, 0, 4, 3, 2, 1, 0. Therefore, regardless of the selected resolution mode, no two of each set of five concurrently-selected correlating double-sampling circuits are connected to the same array readout line.

Additionally, when any given row of pixels is being read out in the above-described embodiment, pixels of one color are read out on the five array readout lines in the column-output circuit 206, and pixels of another color are read out on the five array readout lines in the column-output circuit 210. This feature is advantageous because it tends to reduce crosstalk between pixels of different colors.

Referring still to FIGS. 5 and 6, the manner in which outputs of CDS circuits DST [0 . . . 329] and DSB [0 . . . 329] may be selected will now be described. As mentioned above, in the example embodiment shown, outputs of CDS circuits DST [0 . . . 329] are selectively connected to respective ones of array readout lines line_top [0 . . . 4] via column-select transistors CSTT [0 . . . 329], and outputs of CDS circuits DSB [0 . . . 329] are selectively connected to respective ones of array readout lines line_bot [0 . . . 4] via column-select transistors CSB [0 . . . 329]. The gates of column-select transistors CST [0 . . . 329] are connected, respectively, to the outputs of D flip-flops DT [0 . . . 329], and the gates of column-select transistors CSB [0 . . . 329] are connected, respectively, to the outputs of D flip-flops DB [0 . . . 329].

As illustrated the example embodiment of FIGS. 5 and 6, outputs of certain D flip-flops are connected to the inputs of other D flip-flops via full-resolution transistors FT [0 . . . 329] and FB [0 . . . 329], half-resolution transistors HT [0 . . . 165] and HB [0 . . . 165](only transistors HT [0 . . . 2] and HB [0 . . . 2] are shown), and quarter-resolution transistors QT [0 . . . 82] and QB [0 . . . 82] (only transistors QT [0 . . . 1] and QB [0 . . . 1] are shown). The gates of the full, half, and quarter-resolution transistors are connected, respectively, to full, half, and quarter-resolution select lines F, H and Q. An active resolution-select signal may be provided on only one of full, half, and quarter-resolution select lines F, H and Q at any given time, depending on the resolution desired.

In the example embodiment shown, each of D flip-flops DT [0 . . . 329] and DB [0 . . . 329], as well as final D flip-flops DTF and DBF, receive a common clock. When a particular row of pixels is to be read out, input line sel_in_top may be held high for five clock cycles such that, after the five clock cycles, the output of five D flip-flops in top column-output circuit 206 are active at the same time. Similarly, input line sel_in_bot may be held high for five clock cycles such that, after the five clock cycles, the outputs of five D flip-flops in bottom column-output circuit 210 are active at the same time. The outputs of the active D flip-flops, in turn, determine which column-select transistors are activated at any given time. The five clock cycles during which the signals on input lines sel_in_top and sel_in_bot are held high may be offset by one clock cycle so that information may be read alternatively by the top and bottom column-output circuits 206 and 210.

In this manner, outputs of a group of five CDS circuits in top column-output circuit 206 may be connected to different ones of array readout lines line_top [0 . . . 4], outputs of a group of five CDS circuits in bottom column-output circuit 210 may be connected to different ones of array readout lines line_bot [0 . . . 4] at any given time, and the output of each selected correlated double-sampling circuit may be connected to one of the five array readout lines with which it is associated for five clock cycles. Therefore, in order to maximize the settling time for each of the array readout lines, multiplexers 212 and 214 (FIG. 2) may select each of the array readout lines near the end of the five clock cycles during which the output of the associated correlated double-sampling circuit is connected to it.

In the example embodiment shown, the group of five D flip-flops having active outputs in each of top and bottom column-output circuits 206 and 210 shifts along the sequence of D flip-flops until final D flip-flops DTF and DTB produce active outputs at output lines line sel_out_top and sel_out_bot, respectively. The production of active outputs at output lines line sel_out_top and sel_out_bot may indicate to timing generator 202 (FIG. 2) that column-output circuits 206 and 210 have nearly completed the output of their correlating double-sampling circuits. In response to active signals on output lines line sel_out_top and sel_out_bot, timing generator 202 may cause row-select circuit 204 to select another row in pixel array 208 to be read out and cause correlating double-sampling circuits DST [0 . . . 329] and DSB [0 . . . 329] to perform their double-sampling cycles, as described below.

Figure 7:
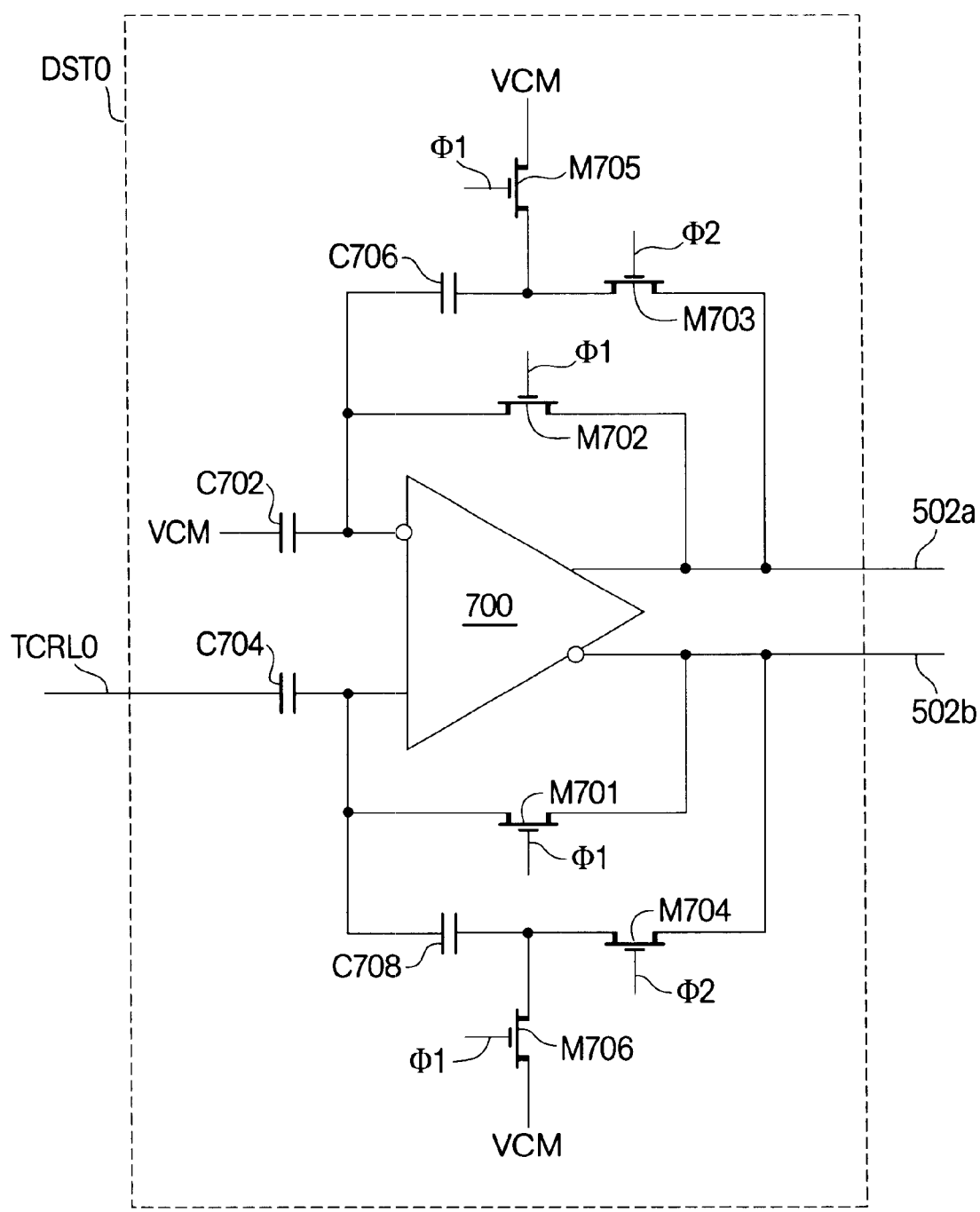
FIG. 7 is a schematic diagram showing an example embodiment one of the correlated double-sampling circuits shown in FIGS. 5 and 6.

FIG. 7 shows an example embodiment of correlating double-sampling (CDS) circuit DST0. Each of CDS circuits DST [0 . . . 329] (FIG. 5) and DSB [0 . . . 329] (FIG. 6) are identical. Therefore, the description of CDS circuit DST0 applies equally well to each of the other CDS circuits shown in FIGS. 5 and 6. In the embodiment shown, CDS circuit DST0 includes a differential amplifier 700, a pair of input capacitors C702 and C704, a pair of feedback capacitors C706 and C708, and switch transistors M701–M706. An output of differential amplifier 700 is provided between a pair of conductors 502a and 502b (represented in FIG. 5 by a single node 502). In an alternative embodiment, a single-ended amplifier arrangement may be used, and CDS circuit DST0 may provide a single-ended output on a single conductor.

In the FIG. 7 example, all of the capacitors C702–C708 have the same value. Input capacitor C702 is connected between common-mode voltage node VCM and an inverting input of amplifier 700, and input capacitor C704 is connected between column-output line TCRL0 and a non-inverting input of amplifier 700. Each of switch transistors M701-M706 has a gate connected either to control line $\Phi 1$ or to control line $\Phi 2$, each of which receives a respective control signal.

In the example shown, transistors M701–M706 are arranged such that: (1)when the signal on control line $\Phi 1$ is active and the signal on control line $\Phi 2$ is inactive, the circuit is in a "unity-gain feedback" configuration, and $\Phi 2$ when the signal on control line $\Phi 2$ is active and the signal on control line $\Phi 1$ is inactive, the circuit is in a "sample" configuration. When the circuit shown in FIG. 7 is operated such that the signal on line $\Phi 1$ is active during a first time period and the signal on line $\Phi 2$ is active during a second time period that follows the first time period, the resulting differential voltage between conductors 502a and 502b during the second time period has an amplitude equal to the difference between the amplitude of the voltage on line TCRL0 during the first time period and the amplitude of the voltage on line TCRL0 during the second time period. Therefore, CDS circuit DST0 acts as a subtraction circuit that subtracts the amplitudes of the voltage on column-output line TCRL0 during first and second time periods, as defined by the signals on control lines $\Phi 1$ and $\Phi 2$, respectively. When an embodiment of CDS circuit DST0 that employs a single-ended amplifier arrangement is used, the CDS circuit may be similarly controlled such that the single-ended signal at its output is equal to a difference between the voltage on column-output line TCRL0 during first and second time periods.

The use of correlated double-sampling circuits such as that shown in FIG. 7 serves to eliminate the effects of variations between the components of the various pixels that might affect the accuracy of the pixels. That is, taking a sample at the output of each pixel both after the pixel has integrated and after the pixel has been reset, and subtracting these two values serves to reduce errors caused by differences between the pixels. For example, if the outputs of two pixels produce different voltages while held in their reset states, i.e., an "offset" exists between them, then this offset is eliminated by performing the subtraction described above. The operation of the CDS circuits is described in more detail below in connection with the description of the timing diagram shown in FIG. 11. It should be appreciated that an embodiment of the present invention may be implemented that does not include the CDS circuits shown in FIGS. 5 and 6, and that the column-output lines may alternatively be selectively connected (via switch transistors) directly to the array readout lines.

Figure 8:
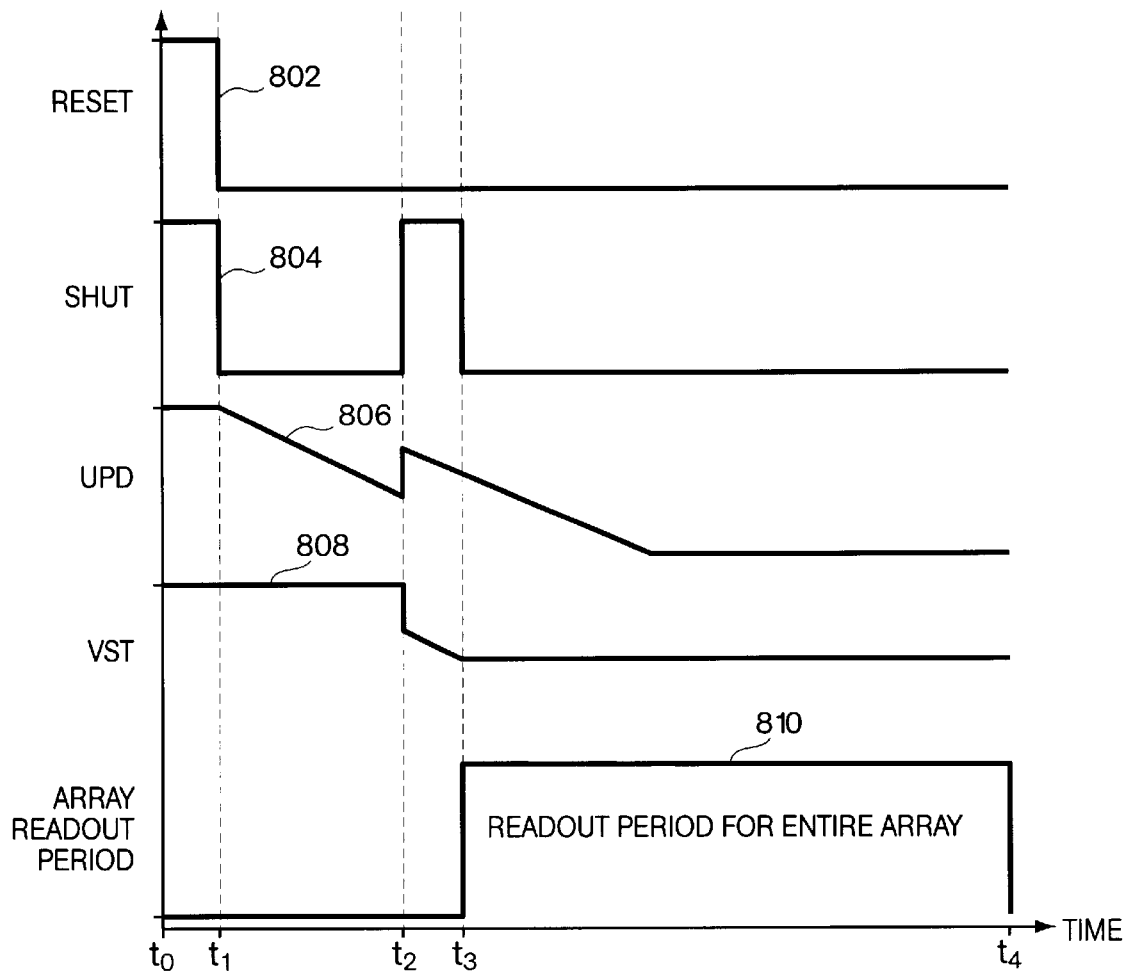
FIG. 8 is a timing diagram illustrating examples of signals that may be used to cause the pixels in the area array shown in FIG. 3 to integrate charge.

FIG. 8 is a timing diagram that illustrates examples of signals that may be used to cause each of the pixels in pixel array 208 (FIG. 2), such as pixel P0,0 (FIG. 4), to integrate charge and how this integrated charge may be stored on storage capacitors within the pixels prior to reading out the contents of the individual pixels in the pixel array. The curves in FIG. 8 are shown on the same time scale (horizontal axis) for comparison. The physical placement of one curve above another does not denote that the signal represented by one curve attains a higher amplitude than the signal represented by the other.

Curves 802 and 804 illustrate signals that may be applied to each of reset lines RESET [0 . . . 499] and shutter lines SHUT [0 . . . 499], respectively, to cause each of the pixels in pixel array 208 (FIG. 3) to integrate charge and store this integrated charge on its storage capacitor (e.g., storage capacitor SC0,0,0 .

Curves 806 and 808 illustrate, respectively, for a particular pixel, the voltage at the cathode of the photodiode of the pixel (e.g., node VPD0,0) and the voltage at the gate of the source-follower transistor of the pixel (e.g., node VST0,0). It should be appreciated that the voltages at the nodes VPD and VST of each of the pixels will vary depending on the amount of light that is incident on the particular pixels.

Curve 810 illustrates the time period, after all of the pixels in the array have been integrated and the integrated charge stored, during which the contents of each of the pixels in the array may be read out. As indicated by the non-infinite duration of curve 810, there is only a limited period of time during which the charge stored by the storage capacitors in each of the pixels will remain accurate. The pixels therefore should be read out during the period indicated by curve 810 or else a new integration of the array should be performed.

As shown, curves 802 and 804 begin (at time $t_0$) in an active state such that the reset transistor and the shutter transistor within each pixel (e.g., RESTRAN0,0 and SHUTRAN0,0) are turned on. At this point, the storage capacitor in each pixel (e.g., storage capacitor SC0,0,) is charged to its maximal value, as indicated by curve 806.

Next, at time to, the signals on the reset and shutter lines RESET [0 . . . 499] and SHUT [0 . . . 499] (curves 802 and 804 respectively) are deactivated such that the reset and shutter transistors within the pixels turn off. During this period, light incident on the photodiodes (e.g., PD0,0) causes the voltage at the cathodes of the photodiodes (e.g., at node VPD0,0) to decrease in proportion to the intensity of the light incident thereon, as indicated by the decreasing level of curve 806 between times $t_1$ and $t_2$.

Next, after integration period between times $t_1$ and $t_2$, the signals on the shutter control lines SHUT [0 . . . 499] for each row of pixels are activated temporarily (between times $t_2$ and $t_3$). When the shutter transistors are turned on, (at time $t_2$) the charge on the cathode of each photodiode (e.g., at node VPD0,0) and the charge previously stored on each storage capacitor (e.g., at node VST0,0) equalize such that the voltages on the storage capacitors instantaneously decrease and the voltages on the cathodes of the photodiodes instantaneously increase, as illustrated by curves 808 and 806, respectively. During the brief period between times $t_2$ and $t_3$ that the shutter transistors are turned on, the voltages at the cathodes of the photodiodes and the voltages on the storage capacitors both decrease, as indicated by the decreasing levels of curves 806 and 808 between times $t_2$ and $t_3$.

Finally, as illustrated by curve 808, after the signals on shutter lines SHUT [0 . . . 399] are deactivated (at time $t_3$), the charge remaining on each of the storage capacitors is indicative of the intensity of the light that was incident on the photodiode associated with the storage capacitor during the integration period. This stored charge remains constant during the readout period (between times $t_3$ and $t_4$) for the entire array, as illustrated by curve 810 . Curve 810 does not represent a signal used in connection with this embodiment of the invention. Rather, curve 810 is shown only to illustrate a time period during which the pixels in pixel array 208 store valid data.

Figure 9:
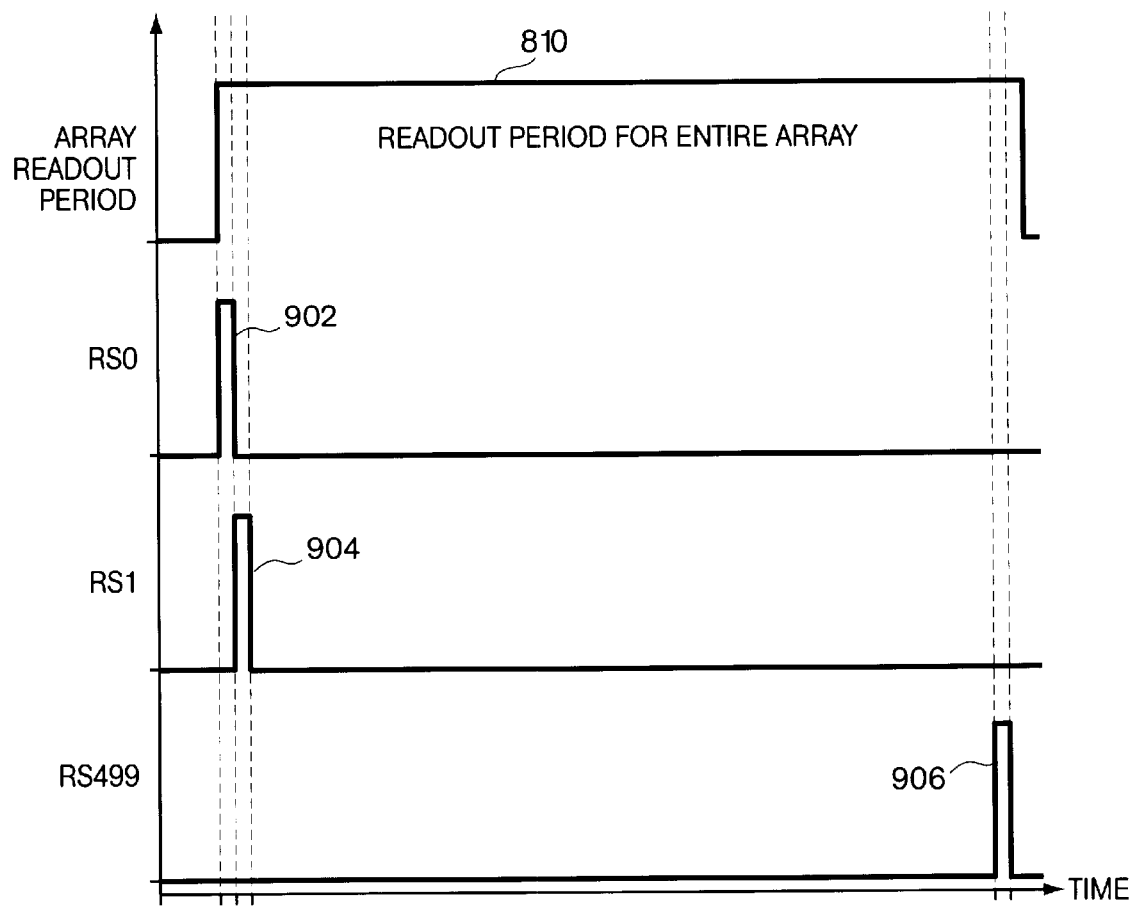
FIG. 9 is a timing diagram illustrating examples of signals that may be used to control the row-select transistors shown in FIG. 3.

FIG. 9 illustrates examples of signals that may be used to select different pixel rows of pixel array 208 (FIG. 3) during the readout period illustrated by curve 810 (FIG. 8). The curves of FIG. 9 are shown on the same time scale (horizontal axis) for comparison. The physical placement of one curve above another does not denote that the signal represented by one curve attains a higher amplitude than the signal represented by the other.

Although it is shown on a different time scale, curve 810 in FIG. 9 is identical to curve 810 in FIG. 8. Curves 902, 904 and 906 represent the signals applied, respectively, to row-select lines RS0, RS1 and RS499. Of course, similar signals also are applied to each of row-select lines RS [2 . . . 498] to select each row of pixels in array 208 for readout during readout period 810 . Additionally, an active signal is applied to control line EVEN when an active signal is applied to an even-numbered one of row-select lines RS [0 . . . 499], and an active signal is applied to control line ODD when an active signal is applied to an odd-numbered one of row-select lines RS [0 . . . 499]. The row-select sequence illustrated in FIG. 9 is ideally suited for readout of array 208 when a fall-resolution mode of operation is selected because each of the rows may be simply selected in sequence in such a mode.

Figure 10A:
FIGS. 10A–10C are diagrams illustrating the order in which rows may be selected when reading out pixels from the area array shown in FIG. 3 in different resolution modes.
Figure 10B:
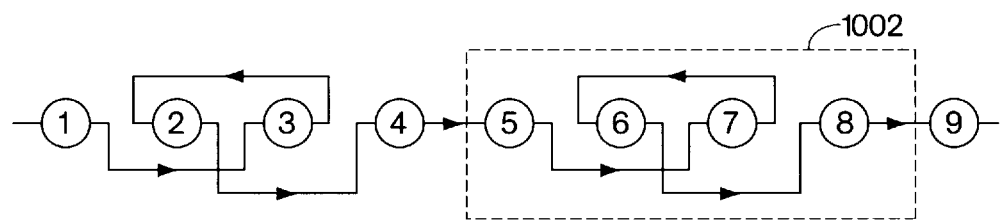
Figure 10C:
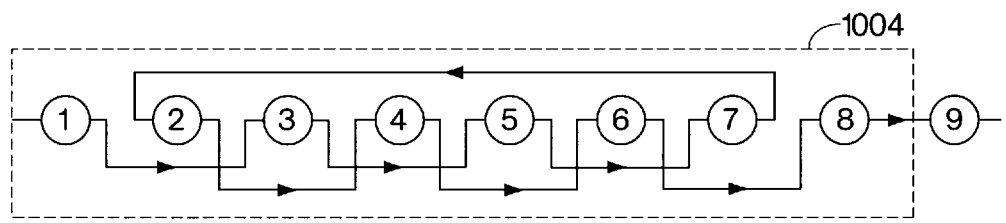

FIGS. 10A–10C illustrate row-selection sequences ideally suited for pixel readout according to fall-resolution, half-resolution, and quarter-resolution modes of operation, respectively. The row-selection sequence illustrated in FIG. 10A therefore corresponds to the sequence illustrated in FIG. 9 wherein each row is merely selected in sequence.

FIG. 10B, on the other hand, illustrates how it is advantageous during the half-resolution mode of operation to read out every other row of pixels, alternating between odd and even rows. This readout sequence is ideal for half-resolution mode when a Bayer pattern of pixels in employed because of the manner in which the pixels are arranged in such a pattern. That is, because the rows in the Bayer pattern alternate between blue and red pixels (mixed with green pixels), to read out the same number of blue or red pixels in sequence that are read out in the full-resolution mode, two rows of blue pixels or two rows of red pixels must be read out sequentially. The selection sequence illustrated in FIG. 10B is ideally suited for this purpose. Block 1002 in FIG. 10B illustrates the portion of FIG. 10B that is repeated during row-selection in half-resolution mode.

For similar reasons, the row-selection sequence illustrated in FIG. 10C is ideally suited for row-selection during the quarter-resolution mode of operation. The portion of the sequence within block 1004 indicates the portion that is repeated during row-selection in quarter-resolution mode.

Figure 11:
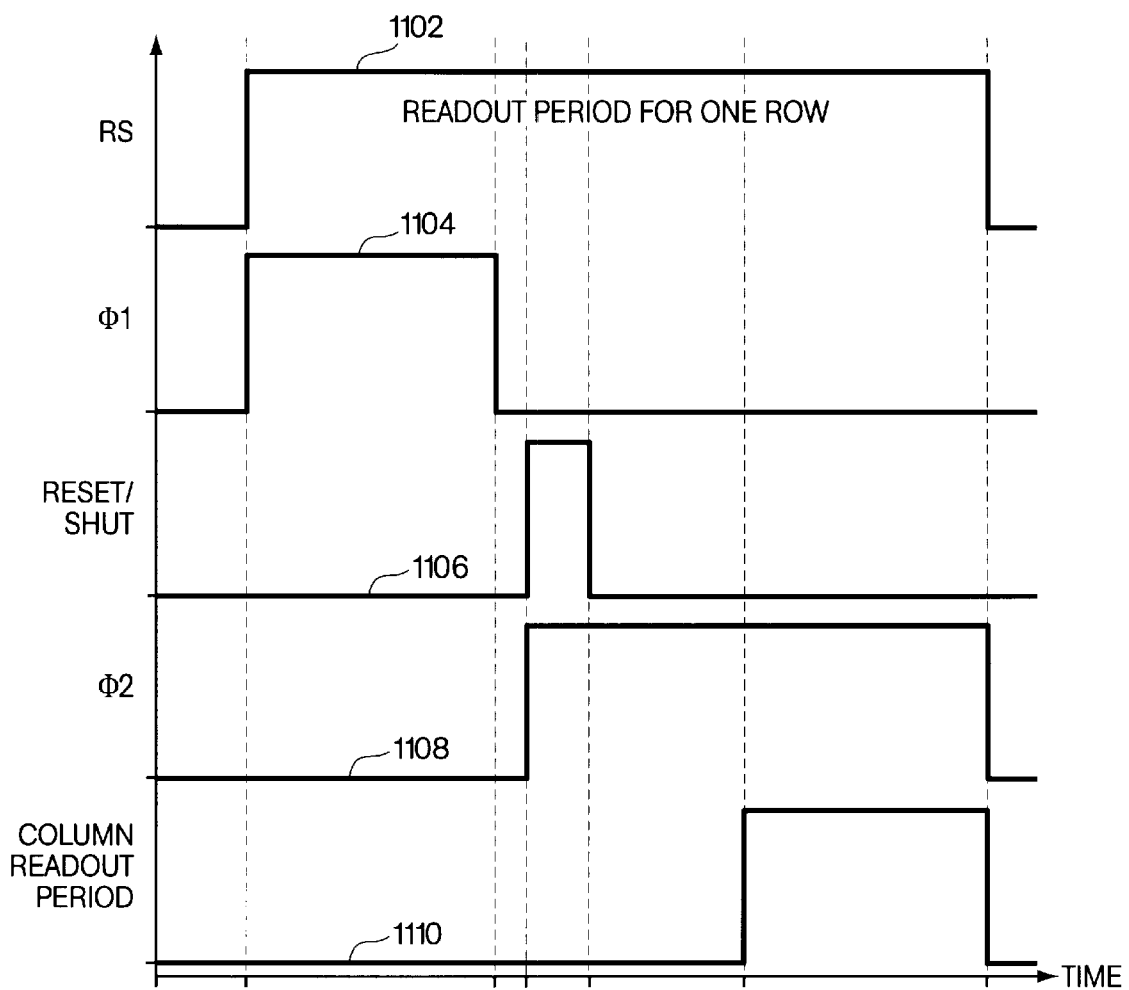
FIG. 11 is a timing diagram illustrating examples of signals that may be used to operate the correlated double-sampling circuits shown in FIGS. 5 and 6.

FIG. 11 illustrates examples of signals that may be used to operate of one of the CDS circuits shown in FIGS. 5 and 6 (e.g., CDS circuit DST0 shown in FIG. 7). The curves of FIG. 11 are shown on the same time scale (horizontal axis) for comparison. The physical placement of one curve above another does not denote that the signal represented by one curve attains a higher amplitude than the signal represented by the other.

Curve 1102 illustrates a signal on one of row-select lines RS [0 . . . 499]. Curve 1102 therefore may correspond (on a different time scale) to any one of curves 902, 904 and 906 shown in FIG. 9. As mentioned above, only one of row-select lines RS [0 . . . 499] carries an active signal at a given time.

Curves 1104 and 1108 represent control signals that may be applied, respectively, to control lines Φ1 and Φ2 (FIG. 7) during the readout period illustrated by curve 1102.

Curve 1106 represents the signals applied to both the control line RESET and the control line SHUT (FIG. 4) for the selected row.

Finally, curve 1110 illustrates a time period during which appropriate ones of column-select transistors CST [0 . . . 329] and CSB [0 . . . 329] (FIGS. 5 and 6) may be sequentially turned on to provide the outputs of the correlated double-sampling circuits to array readout lines line_top [0 . . . 4] and line_bot [0 . . . 4] for each of the pixels in the selected row.

Figure 12A:
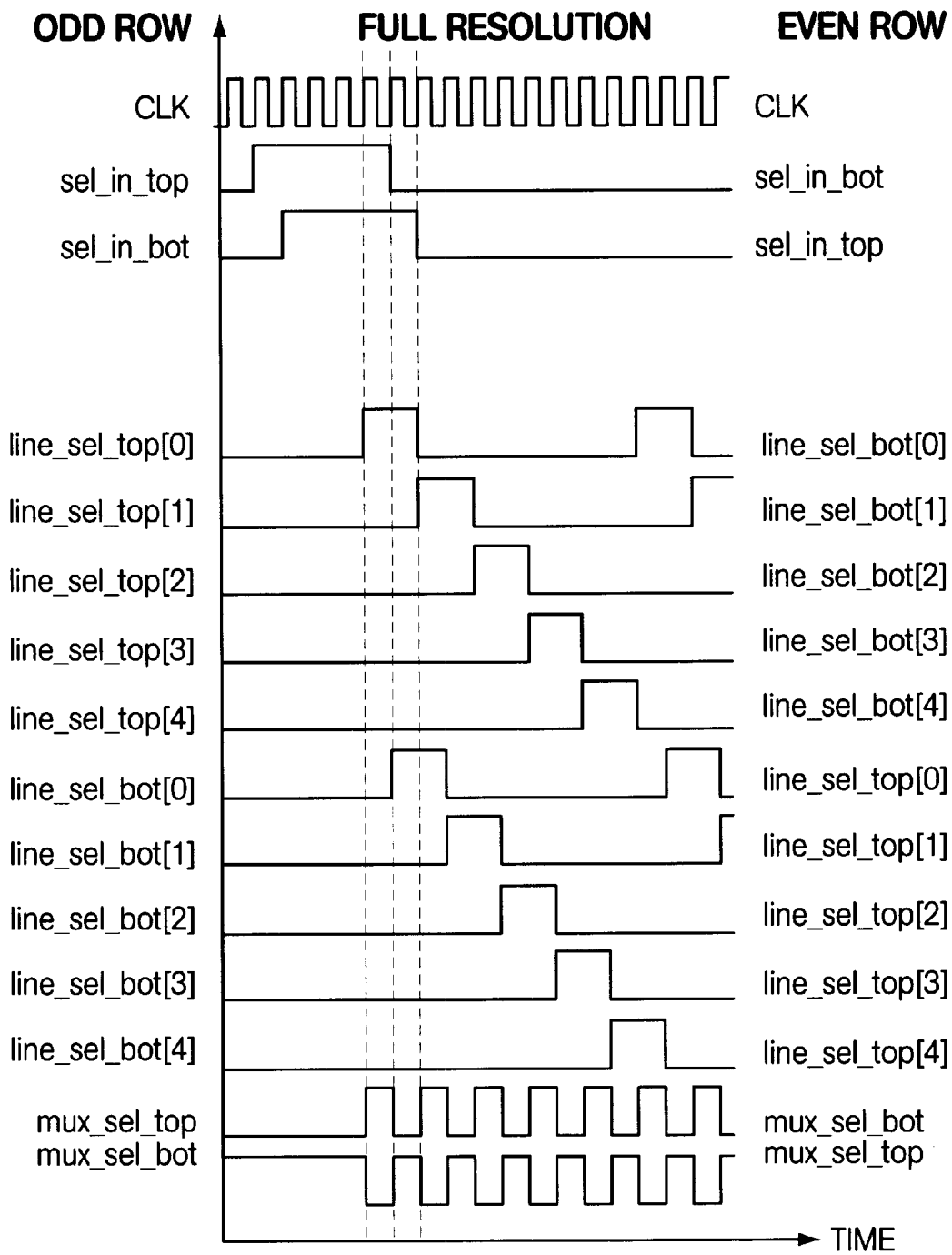
FIG. 12 is a timing diagram illustrating examples of signals that may be used to control the multiplexers shown in FIG. 2.
Figure 12B:
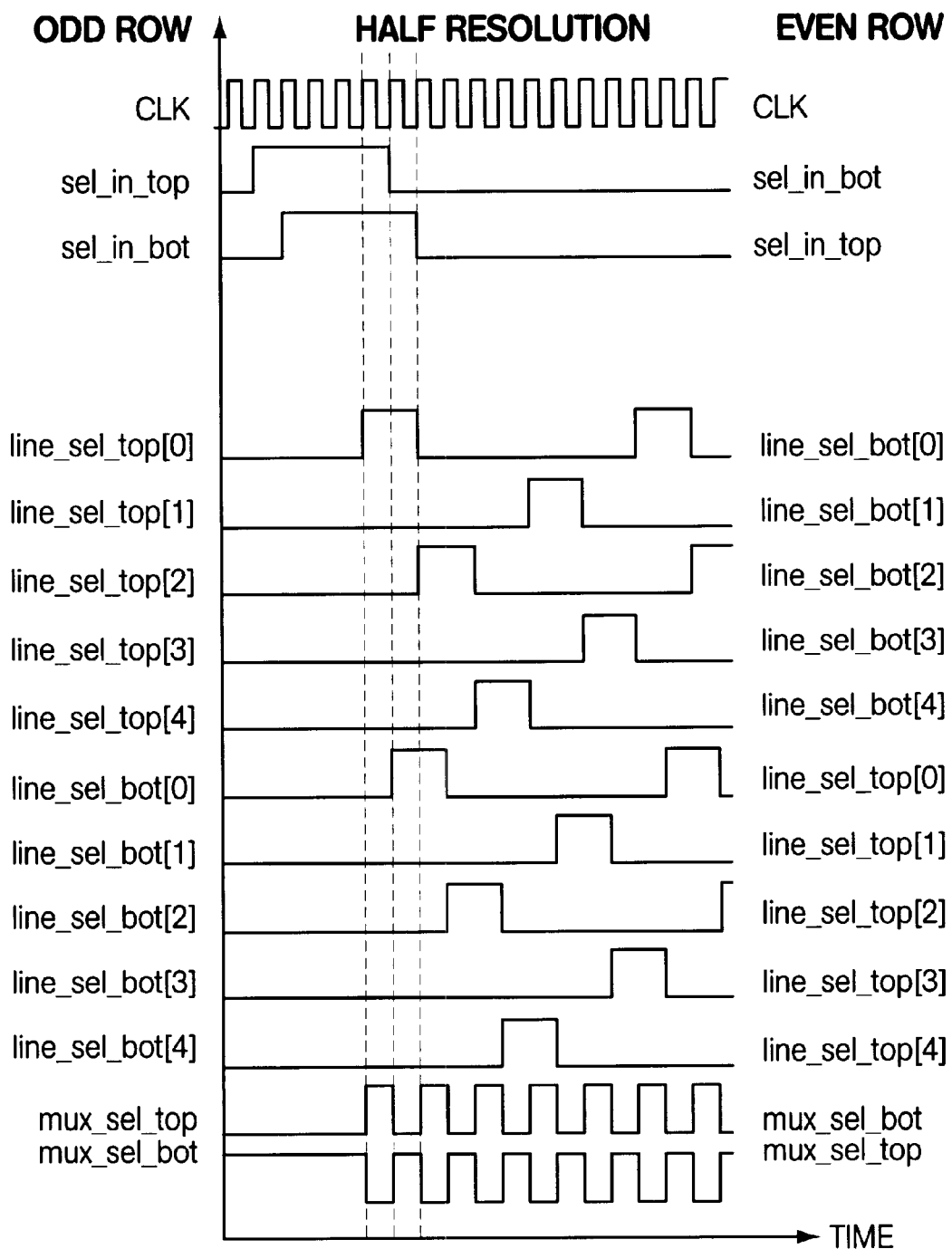
Figure 12C:
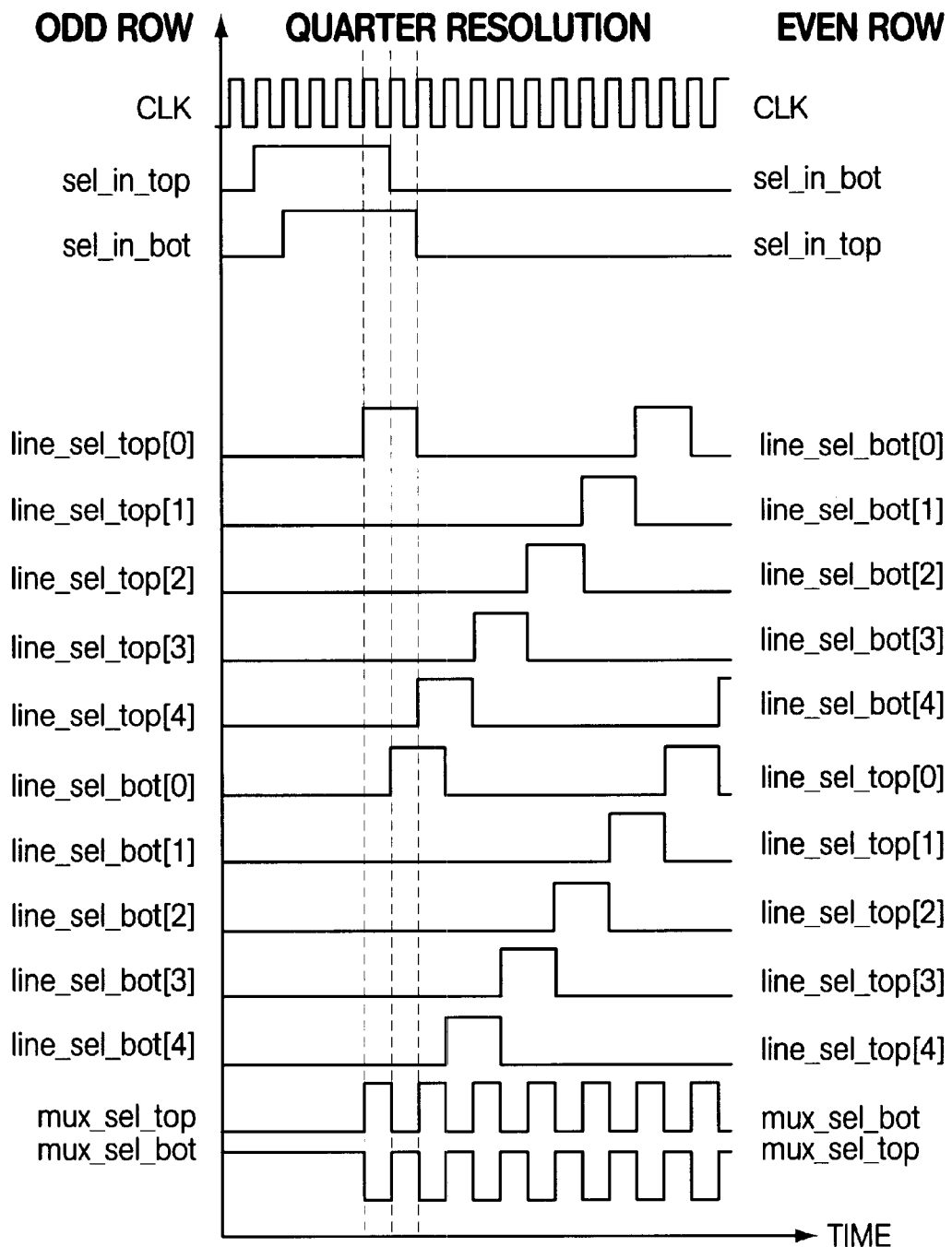

FIG. 12 illustrates examples of signals that may be applied to multiplexers 212, 214, and 216 to select appropriate ones of array readout lines line_top [0 . . . 4] and line_bot [0 . . . 4] to be provided to programmable gain amplifier 218 during the full-resolution, half-resolution, and quarter-resolution modes of operation. FIG. 12 also illustrates (for each of the full-resolution, half-resolution, and quarter-resolution modes of operation) the appropriate relationship between: (a) the signal applied to clock line CLK (FIGS. 5 and 6); (b) the signals applied to control lines select_in_top and select_in_bot (FIGS. 5 and 6); (c) the signals applied to control lines line_sel_top [0 . . . 4] and line_sel_bot [0 . . . 4] of multiplexers 212 and 214 (FIG. 2); and (d) the signals applied to control lines mux_sel_top and mux_sel_bot of multiplexer 216 (FIG. 2).

It should be noted that the signals applied to the inputs sel_in_top and sel_in_bot are inverted when an even row of pixels is selected as opposed to an odd row. Similarly, the signals applied to line_sel_top [0 . . . 4] and line_sel-bot [0 . . . 4], as well as mux_sel_top and mux_sel_bot, are inverted when an even row is selected as opposed to an odd row.

It should be appreciated that, while a particular embodiment of a pixel and a particular technique for causing the pixels in an array to integrate charge have been described herein, alternative pixel embodiments and/or alternative techniques for causing the pixels to integrate charge in response to incident light may be employed without departing from the intended scope of the present invention. For example, while the pixels described herein are active pixel sensors, passive pixel sensors, i.e., pixels including no active devices (e.g., source-follower transistors), may alternatively be used.

Also, while particular techniques for selecting particular pixels in an array for readout (e.g., rows and column selection), alternative pixel-selection techniques may employed in connection with different embodiments of the present invention.

Further, while the outputs of the pixels have been described herein as being processed by double-sampling circuits prior to being supplied to array readout lines, the pixel outputs may alternatively be supplied to the array readout lines without being so processed. If desired, CDS processing may be performed on a different integrated circuit (IC) than the IC on which a circuit according to an embodiment of the invention is disposed.

Additionally, while selective connections between different elements have been shown and described herein as being performed by MOS transistors, any other devices that perform switch-like functions may alternatively be used.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An image sensor, comprising: an area pixel array including first columns of pixels arranged in first rows, each first column and each first row of pixels including pixels of a first type which are sensitive to a first color of light;

first column readout lines, each first column readout line being selectively coupled to outputs of the pixels of the first type that are included in a respective first column of pixels, wherein, for each first row of pixels, respective pixels of the first type included in the first row of pixels are selectively coupled to respective first column readout lines; and a plurality of first array readout lines, each first array readout line being selectively coupled to at least one of the first column readout lines;

wherein: adjacent ones of the first column readout lines are selectively coupled to different ones of the first array readout lines; each first column readout line included in each group of five adjacent first column readout lines is selectively coupled to a respective one of the first array readout lines; and every sixth adjacent one of the first column readout lines is selectively coupled to a common one of the first array readout lines.

2. The image sensor as claimed in claim 1, wherein:

the area pixel array further includes second columns of pixels arranged in second rows, each second column and each second row of pixels including pixels of a second type which are sensitive to a second color of light; and the image sensor further comprises:

second column readout lines, each second column readout line being selectively coupled to outputs of the pixels of the second type that are included in a respective second column of pixels, wherein, for each second row of pixels, respective pixels of the second type included in the second row of pixels are selectively coupled to respective second column readout lines; and a plurality of second array readout lines, each second array readout line being selectively coupled to at least one of the second column readout lines.

3. The image sensor as claimed in claim 2, wherein:

the first and second columns of pixels each include pixels of a third type which are sensitive to a third color of light; and each of the pixels of the third type that is included in one of the first and second columns is selectively coupled to one of the first and second column readout lines.

4. The image sensor as claimed in claim 1, further comprising double-sampling circuits, each first array readout line being selectively coupled to the at least one of the first column readout lines via one of the double-sampling circuits.

5. The image sensor as claimed in claim 1, wherein each first array readout line is selectively coupled to a plurality of the first column readout lines.

6. The image sensor as claimed in claim 1, further comprising a multiplexer having inputs coupled to respective ones of the first array readout lines.

7. The image sensor as claimed in claim 1, further comprising means for controlling an order in which the first column readout lines are coupled to the first array readout lines.

8. The image sensor as claimed in claim 7, further comprising means, responsive to at least one resolution-select signal, for adjusting the means for controlling to cause the means for controlling to couple only particular ones of the first column readout lines to the first array readout lines.

9. The image sensor as claimed in claim 1, wherein at least two of the first column readout lines are selectively coupled to different ones of the first array readout lines.

10. An image sensor, comprising:
a pixel array including at least one first row of pixels, the at least one first row of pixels including pixels of a first type which are sensitive to a first color of light;
first column readout lines, each first column readout line being selectively coupled to an output of a respective pixel of the first type that is included in the at least one first row of pixels; and
a plurality of first array readout lines, each first array readout line being selectively coupled to at least one of the first column readout lines;
wherein: adjacent ones of the first column readout lines are selectively coupled to different ones of the first array readout lines; and each first column readout line included in each group of five adjacent first column readout lines is selectively coupled to a respective one of the first array readout lines.

11. The image sensor as claimed in claim 10, wherein:
the pixel array further includes at least one second row of pixels, the at least one second row of pixels including pixels of a second type which are sensitive to a second color of light; and
the image sensor further comprises:
second column readout lines, each second column readout line being selectively coupled to an output of a respective pixel of the second type that is included in the at least one second row of pixels; and
a plurality of second array readout lines, each second array readout line being selectively coupled to at least one of the second column readout lines.

12. The image sensor as claimed in claim 11, wherein:
each of the first and second rows of pixels further includes pixels of a third type which are sensitive to a third color of light; and
each of the pixels of the third type that is included in one of the first and second rows is selectively coupled to one of the first and second column readout lines.

13. The image sensor as claimed in claim 10, further comprising double-sampling circuits, each first array readout line being selectively coupled to the at least one of the first column readout lines via one of the double-sampling circuits.

14. The image sensor as claimed in claim 10, wherein every sixth adjacent one of the first column readout lines is selectively coupled to a common one of the first array readout lines.

15. The image sensor as claimed in claim 10, wherein each first array readout line is selectively coupled to a plurality of the first column readout lines.

16. The image sensor as claimed in claim 10, further comprising a multiplexer having inputs coupled to respective ones of the first array readout lines.

17. The image sensor as claimed in claim 10, further comprising means for controlling an order in which the first column readout lines are coupled to the first array readout lines.

18. The image sensor as claimed in claim 17, further comprising means, responsive to at least one resolution-select signal, for adjusting the means for controlling to cause the means for controlling to couple only particular ones of the first column readout lines to the first array readout lines.

19. The image sensor as claimed in claim 10, wherein at least two of the first column readout lines are selectively coupled to different ones of the first array readout lines.

20. A method for reading outputs of light-sensitive pixels included in a pixel array, comprising steps of:
(a) reading an output of a first pixel of the pixel array, which is included in a first row of pixels and sensitive to a first color of light, onto a first column readout line;
(b) reading an output of a second pixel of the pixel array, which is included in the first row of pixels and sensitive to the first color of light, onto a second column readout line;
(c) reading the output of the first pixel from the first column readout line onto a first array readout line;
(d) reading the output of the second pixel from the second column readout line onto a second array readout line;
(e) reading an output of a third pixel of the pixel array, which is included in a second row of pixels and sensitive to a second color of light, onto a third column readout line;
(f) reading an output of a fourth pixel of the pixel array, which is included in the second row of pixels and sensitive to the second color of light, onto a fourth column readout line;
(g) reading the output of the third pixel from the third column readout line onto a third array readout line;
(h) reading the output of the fourth pixel from the fourth column readout line onto a fourth array readout line;
(i) reading an output of a fifth pixel of the pixel array, which is included in the first row of pixels and sensitive to a third color of light, onto the third column readout line;
(j) reading an output of a sixth pixel of the pixel array, which is included in the second row of pixels and sensitive to the third color of light, onto the first column readout line;
(k) reading the output of the fifth pixel from the third column readout line onto the third array readout line; and
(l) reading the output of the sixth pixel from the first column readout line onto the first array readout line.

21. The method of claim 20, wherein:
the step (c) includes a step of using a first double-sampling circuit to read the output of the first pixel from the first column readout line onto the first array readout line; and the step (d) includes a step of using a second double-sampling circuit to read the output of the second pixel from the second column readout line onto a second array readout line.

22. The method of claim 20, further comprising a step of:
(m) reading the outputs of the first and second pixels from the respective first and second array readout lines serially onto a common output line.

23. The method of claim 20, further comprising a step of:
(i) reading the outputs of the first, second, third, and fourth pixels from the first, second, third, and fourth array readout lines serially onto a common output line.

24. The method of claim 20, further comprising a step of:
(m) reading the outputs of the first, second, third, fourth, fifth, and sixth pixels from the first, second, third, and fourth array readout lines serially onto a common output line.

* * * * *

UNITED STATES PATENT AND TRADEMARK OFFICE
CERTIFICATE OF CORRECTION

PATENT NO.    : 6,512,546 B1
DATED         : January 28, 2003
INVENTOR(S)   : Decker et al.

It is certified that error appears in the above-identified patent and that said Letters Patent is hereby corrected as shown below:

Column 1,
Line 66, after "pixel" and before "row-" please insert
-- row "0" may be selected by closing --.

Column 9,
Line 3, please replace "CSTT" with -- CST --.

Column 11,
Line 46, please replace "to" with -- $t_1$ --.

Column 12,
Lines 37 and 41, please replace "fall-resolution" with -- full-resolution --.

Signed and Sealed this

Sixteenth Day of September, 2003

JAMES E. ROGAN
*Director of the United States Patent and Trademark Office*